Feb. 12, 1929.

H. PERROT 1,701,505

VEHICLE BRAKING SYSTEM

Filed Jan. 29, 1924

INVENTOR
HENRI PERROT
BY
A. D. T. Libby
ATTORNEY

Patented Feb. 12, 1929.

1,701,505

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

VEHICLE BRAKING SYSTEM.

Application filed January 29, 1924. Serial No. 689,218.

This invention relates to means for applying brakes to the wheels of a vehicle.

It is the principal object of my invention to provide independent braking mechanisms which may be actuated independently of each other or simultaneously on the same brake or brake members.

Another object of my invention is to provide a dual system of braking which is relatively simple and, therefore, easy to manufacture and keep in operative condition.

My invention will be readily understood by reference to the attached drawing in which:

Figure 4 is an arrangement similar to Fig. 3, but in which the fluid operated part includes a sylphon element; while

Figure 1:
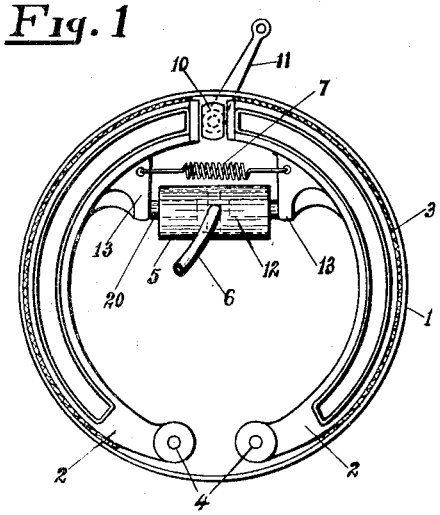
Figure 1 shows a manual mechanism as well as a hydraulically operated mechanism, both operating on a pair of internal brake members.
Figure 2:
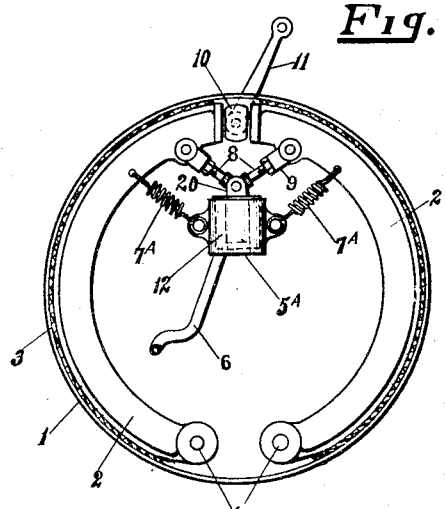
Figure 2 is an arrangement similar to Fig. 1, but in which the hydraulically operated mechanism acts indirectly or through a set of levers.
Figure 3:
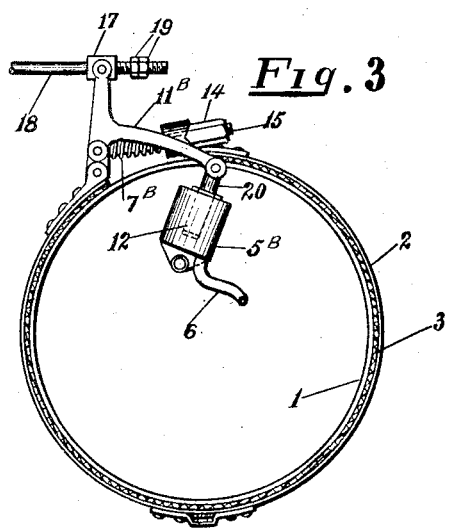
Figure 3 is an arrangement of a dual braking scheme to an outside or band brake.
Figure 4:
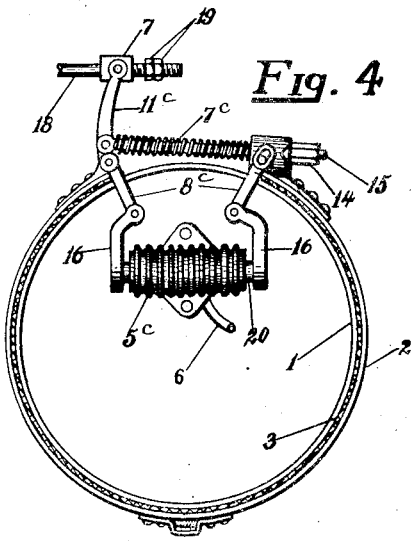
Figure 5:
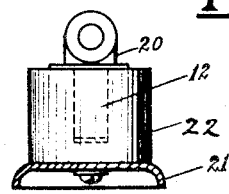
Figure 5 is a detailed view on a different scale, from any of the other figures, of the piston and plunger used in the hydraulic mechanism.

Referring now to the details wherein like numbers refer to corresponding parts in the various views, 1 illustrates the drum on the wheel to which the brakes are to be applied. 2 is a pair of brake shoes or brake bands, as illustrated in Figs. 3 and 4, pivoted at 4 and having a brake lining 3. As shown in Fig. 1, the brake shoes 2 are provided with shoulders 13 against which rests the end of a plunger 12 which has a free fit in the piston 22 that operates in the cylinder 5. In Fig. 1 this cylinder is a double acting one; that is to say, there are two pistons, one in each end of the cylinder as well as two plungers, the ends 20 of which are in direct engagement with the shoulders 13. The fluid pipe 6 enters the cylinder 5 between the two pistons in Fig. 1 and the end of the piston in Figs. 1 and 3. A spring 7 is used to hold the brake shoes 2 normally away from the drum 1. Positioned between the ends of the brake shoes, Figs. 1 and 2, is a cam 10 which is connected with a manually operated lever 11, from which it will be seen that an operation of the lever 11 in the proper direction, forces the brake shoes into engagement with the drum. Likewise an application of pressure in the usual fluid cylinder causes this fluid to pass through the pipe 6 into the cylinder 5, thereby actuating the pistons 22 and through the plunger 12, the brake shoes. In Fig. 2 the end 20 of the plunger 12 is connected through the parts 8 and 9 of the toggle levers to the brake shoes 2. In this arrangement there is a single piston only in the cylinder 5$^A$. Since the plunger 12 has a free movement in the piston 22, when the manually operated cam 10 is actuated, the plunger 12 is merely pulled out of the piston 22. When the hydraulic system is used, the piston 22 acts against the end of the plunger as will be more clearly seen with reference to Fig. 5, which also shows a flexible washer 21 for engaging the walls of the cylinder in the ordinary manner of pistons of this character. In Figure 2 the shoes are shown retracted by two springs 7$^A$.

In Fig. 3 the brake bands 2 are operated by the pull rod 18, which has an over-running connection with the block 17 by having the adjusting nuts 19 set in the proper position. A lever 11$^B$ connects the manual brake arm to the end 20 of the plunger 12 of the hydraulic system, 15 being the bolt carrying the returning spring 7$^B$ and 14 being the usual adjusting nut. It will be seen from this figure that both systems are provided with an over-running device so that either may be operated independent of the other, or both operated simultaneously. In Fig. 4 the arrangement is somewhat like that shown in Fig. 3, except that the operating system acts through an expanding element 5$^C$, similar to the well known sylphon device.

It will be apparent from an inspection of the drawings, which are merely illustrative in character, that the same set of brake members are provided with two independent braking mechanisms, so that if something should go wrong with one of the systems, outside the wheel itself, the other system of actuating the brake members may be used, or under normal conditions both systems may be used, which is advantageous in that many sudden stops are required and a dual acting system can be operated with greater effect on the braking members than one system alone.

While I have indicated in the drawings how my dual system may be applied, I do not wish to be limited to the exact details for carrying the same into effect, as these may be varied over quite wide limits, for example this dual system may be applied to any rotating part, such as the propeller shaft of an automotive vehicle, which sort of an application is sometimes referred to as a transmission brake.

Having thus described my invention what I claim is:

1. Means for applying brakes to a vehicle wheel having a brake drum, comprising braking members positioned so as to be brought into engagement with said drum, manually operated mechanism for actuating the braking members, separate hydraulically actuated mechanism engaging different parts of the same braking members and operable independently of or in conjuction with said manual mechanism, and means, separate from the manual mechanism and the hydraulically actuated mechanism, for taking the braking torque.

2. Means for applying brakes to a vehicle wheel having a brake drum, comprising braking members positioned so as to be brought into engagement with said drum, and a plurality of independent mechanisms engaging different parts of said members and adapted to function together or separately as desired to cause said braking members to engage the wheel drum, each of said mechanisms being operable to apply the brake independently of the presence or absence of the other.

3. Means for applying brakes to a vehicle wheel having a brake drum, comprising braking members positioned so as to be brought into engagement with said drum, manually operated mechanism for actuating the braking members and a separate mechanism having no parts in common with said manually operated mechanism and operated by a fluid for acting on the same braking members to cause them to engage the wheel drum, each of said mechanisms being operable to apply the brake independently of the presence or absence of the other.

4. Means for applying brakes to a vehicle wheel having a brake drum, comprising braking members positioned so as to be brought into engagement with said drum, manually operated mechanism for actuating the braking members and a separate mechanism having no parts in common with said manually operated mechanism and operated by a fluid for acting on the same braking members to cause them to engage the wheel drum, at least one of said mechanisms including an over-running connection with the braking members whereby either mechanism may be used independently of the other to operate the braking members.

5. Means for applying brakes to a vehicle wheel having a brake drum, comprising braking members positioned so as to be brought into engagement with said drum, manually operated mechanism for actuating the braking members and a separate mechanism having no parts in common with said manually operated mechanism and operated by a fluid for acting on the same braking members to cause them to engage the wheel drum, and an over-running connection associated with the fluid operated mechanism consisting of a piston having a bore therein and a plunger fitting in said bore, said plunger being connected to said braking members whereby when the braking members are operated by the manual mechanism, the plunger is merely withdrawn from the piston, but when the fluid mechanism is used the piston pushes the plunger to cause it to actuate the braking members, as described.

6. In a dual braking system for a rotating part braking members associated with said part, mechanical means for actuating the braking members, and an independent mechanism adapted to be operated by a fluid under pressure for actuating the same braking members and engaging different parts of said members, in combination with means, separate from the mechanical means and the independent fluid mechanism, for taking the braking torque.

7. Means for applying a brake to a rotating part of a vehicle, comprising a braking member positioned so as to be brought into engagement with the rotating part, manually operated mechanism for actuating the braking member and a separate mechanism operated by a fluid for acting on a different part of the same braking member to cause it to engage the rotating part, each of said mechanisms being operable to apply the brake independently of the presence or absence of the other.

8. A braking system comprising, in combination, retarding means, a mechanical connection to operate said means, and a fluid-operated device also directly connected by an over-running connection to said retarding means, and having no parts in common with said mechanical connection, to operate said means.

9. A braking system comprising, in combination, retarding means, connections for operating said means, a cylinder and piston, and a part separate from said connections and engaging a different part of the retarding means from said connections and operated by the piston in one direction to operate said means but so arranged as to move idly with respect to the piston when the connections are operated.

10. A braking system comprising, in combination, a drum, friction means within the drum having adjacent free ends, and two different applying devices engaging different parts of said means to force said ends apart, one device being arranged between the ends and the other including a toggle pivoted adjacent said ends and having its knuckle arranged between said one device and the center of the drum.

11. A braking system comprising, in combination, a drum, friction means within the drum having adjacent free ends, and two different applying devices engaging different parts of said means to force said ends apart, one device being arranged between the ends and the other including a toggle pivoted adjacent said ends.

12. A braking system comprising, in combination, a drum, friction means within the drum having adjacent free ends, and two different applying devices engaging different parts of said means to force said ends apart, one device being arranged between the ends and the other including a toggle pivoted adjacent said ends, one of said devices being purely mechanical and the other being hydraulically operated.

13. A brake comprising, in combination, a drum, friction means within the drum having adjacent separable ends and anchored at the side of the drum opposite said ends, and a plurality of applying devices structurally independent throughout and which act at different points on said ends and either of which is operable to apply the brake in case of failure of the other.

14. A brake comprising, in combination, a drum, friction means within the drum having adjacent separable ends, and a plurality of applying devices structurally independent throughout and which act at different points on said ends and either of which is operable to apply the brake in case of failure of the other, one of said devices having direct but disconnected engagement with said ends and the other of said devices being pivotally-connected adjacent said ends.

15. A brake comprising, in combination, a drum, a pair of semicircular rigid brake shoes within the drum, pivot means for anchoring adjacent ends of said shoes at one side of the drum, the other ends of said shoes being separable to apply the brake, a mechanical applying device acting on said separable ends, and a hydraulic applying device structurally independent of the mechanical device in its action on said shoes and which also acts on said separable ends.

16. In brake mechanism of the character described, the combination with a rotatable brake-drum, of a pair of brake-shoes mounted within the drum and engageable therewith, spring means for holding said shoes in a release position, a mechanically-operable means engaged by said shoes, and fluid-pressure-operated means independently engageable with said shoes for moving said shoes into engagement with said drum, said mechanically operable means and said fluid-pressure-operated means being also conjointly operable to move said shoes into braking engagement with said drum.

17. In brake mechanism of the character described, the combination with a rotatable brake-drum, of a brake member, fluid-pressure-operated means acting at one point on said member to move it into braking engagement with said drum, manually-operated means acting at another point on said member to move it into braking engagement with said drum, said fluid-pressure-operated means and said manually operable means being also conjointly operable to move said brake member into engagement with said drum and means to release said brake member from said drum.

18. In brake mechanism of the character described, the combination with a rotatable brake drum, of a brake engageable with the drum, fluid-pressure-operated means for applying the brake, manually-operated means acting independently of said fluid-pressure-operated means for applying the brake and including a member acting as a stop to determine the release position of the brake, and means to release the brake.

19. In brake mechanism of the character described, the combination with a brake-drum, of a brake having parts relatively movable to engage the drum, an expander acting on the free ends of said parts to move them into braking engagement with the drum, spring means acting to normally hold said parts in a release position defined by the inoperable position of said expander, and fluid-pressure-operated means adjacent the free ends of said parts and in thrusting engagement therewith for moving the same into braking engagement with the drum.

In testimony whereof, I affix my signature.

HENRI PERROT.